United States Patent
Dent et al.

(10) Patent No.: US 6,626,035 B1
(45) Date of Patent: Sep. 30, 2003

(54) APPARATUS AND METHOD FOR TIRE PRESSURE MEASUREMENT

(75) Inventors: Nigel Alastair Dent, Harberton Mead (GB); Nigel Lewis, Princess Risborough (GB)

(73) Assignee: Rollagauge Limited (GB)

( * ) Notice: Subject to any disclaimer, the term of this patent is extended or adjusted under 35 U.S.C. 154(b) by 0 days.

(21) Appl. No.: 09/763,487
(22) PCT Filed: Aug. 20, 1999
(86) PCT No.: PCT/GB99/02736
§ 371 (c)(1), (2), (4) Date: Feb. 21, 2001
(87) PCT Pub. No.: WO00/11442
PCT Pub. Date: Mar. 2, 2000

(30) Foreign Application Priority Data
Aug. 21, 1998 (GB) .............................................. 9818254

(51) Int. Cl.[7] .............................................. B60C 23/02
(52) U.S. Cl. .......................... 73/146.2; 73/146; 340/442
(58) Field of Search ................................ 73/146, 146.2, 73/146.5, 862; 340/442, 443, 444

(56) References Cited

U.S. PATENT DOCUMENTS 5,445,020 A * 8/1995 Rosensweig ................ 73/146.2

FOREIGN PATENT DOCUMENTS

| EP | 0545641 A2 | 6/1993 |
| EP | 0656269 A1 | 6/1995 |

* cited by examiner

Primary Examiner—Andrew H. Hirshfeld
Assistant Examiner—Marissa Ferguson
(74) Attorney, Agent, or Firm—Sheridan Ross P.C.

(57) ABSTRACT

An apparatus is capable of determining inflation pressure of a pneumatic tire mounted on the wheel of a vehicle, the tire being in contact with a support over a contact area. The apparatus comprises: (i) sensing means comprising one or more sensors within said support, each sensor being adapted to measure the average contact pressure over the sensor between said tire and said support, and each having a surface area less than the said contact area; and (ii) processing means adapted to determine an average contact pressure between said tire and said support from an output of only a sensor or sensors which fall entirely within said contact area so as to provide a measure of the inflation pressure of the tire to a first order of accuracy. A corresponding method is also disclosed.

13 Claims, 3 Drawing Sheets

APPARATUS AND METHOD FOR TIRE PRESSURE MEASUREMENT

This application claims foreign priority benefits under 35U.S.C. §119 from United Kingdom Patent Application Serial No. 9818254.6 filed Aug. 21, 1998, and under 35 U.S.C. §120 from PCT Patent Application Serial No. PCT/GB99/02736.

The present invention relates to an apparatus for determining the inflation pressure of a pneumatic tire mounted on the wheel of a vehicle. It also relates to a method of measuring such pressure.

Almost all motor vehicles in use today utilize pneumatic tires, that is to say, tires that depend on an internal gas pressure for their proper functioning and reliability. Vehicle and tire manufacturers go to considerable lengths in the design of their products to achieve optimum performance, and they consequently carefully specify the match between the tire type and the vehicle and the operating conditions of the tire. Hence pneumatic tires should be maintained at appropriate pressures in order to achieve optimum safety, comfort, road handling, fuel economy and tire longevity.

In ordinary use, pressures in tires vary considerably, and this can be due merely to slow leakage, for example due to permeation over time or temperature variation, or can be due to faster leakage instead. The latter can be due to faults or episodic pressure loss, for instance because of impact when riding over a curb. For all these reasons, frequent checks on the inflation pressure of pneumatic, tires are recommended by all authorities.

The ordinary process of checking tire pressure, however, is generally user unfriendly, since it firstly requires the removal of the dust cap, and occasionally other parts of the wheel trim, all of which are usually covered in road dirt, and secondly requires the awkward manipulation of a tire pressure gauge. The unattractive nature of these tasks often discourages regular checking, with consequent effects on fuel economy, tire longevity and vehicular safety.

European Patent Application No. 0545641A discloses a system for determining the pressure of pneumatic vehicular tires, by using a linear array of load sensors arranged to provide a pattern of force distribution data exerted by each tire in contact with the sensors, measurements being taken along a line across the width of each tire. A computer is used to determine the tire pressure from the force distribution data, with the tire pressure being determined by a decomposition method or an analysis technique, such as determining the pseudo pressure, and involves the use of neural networks.

European Patent Application No. 0656269A describes a system similar to that disclosed in European Patent Application 0545641A, but provides a two dimensional array of load sensors giving a two-dimensional (rather than one dimensional) pattern of the force distribution exerted by the tire. This is achieved by either a linear array of sensors in contact with the tire and along a line across the width of the tire as the tire rolls thereover, or by a two- dimensional array of sensors in contact with the tire. Again, the analysis technique used involves the extracted data being fed into a neural network.

Such prior systems involve complex processing of much data, and an aim of the present invention is to provide an apparatus and method which are able to determine inflation pressure quickly, easily and in a much simpler way, primarily to a first order of accuracy. The present invention also aims to allow such a first order of accuracy measurement to be further refined to give a more accurate determination of inflation pressure.

Thus, according to a first aspect of the present invention, an apparatus is provided for determining inflation pressure of a pneumatic tire mounted on the wheel of a vehicle, the tire being in contact with a support over a contact area, said apparatus comprising:

(i) sensing means comprising one or more sensors within said support, each sensor adapted to measure the average contact pressure over the sensor between said tire and said support, and each having a surface area less than the said contact area; and (ii) processing means adapted to determine an average contact pressure between said tire and said support from output signals of only a sensor or sensors which fall entirely within said contact area, so as to provide a measure of the inflation pressure of the tire to a first order of accuracy.

If a tire is considered hypothetically to be composed of material forming a perfect membrane, such a tire would have a circular profile when inflated, but unloaded. However, when such a perfect tire is loaded, the area of the tire in contact with its support (for example the road) is typically substantially flat. Increases in total load on such a tire to a first degree of order merely result in a greater contact area, that is area of tire in contact with the support.

However, in practice, tires cannot be assumed to be perfect, but instead are subject to factors such as tire construction, stiffness and tread type which affect the fringe of the contact area. If such fringe effects are ignored, the tire behaves more like a perfect membrane and thus by ignoring fringe effects it can be expected that increases in total load merely result in a greater contact area.

By ignoring fringe effects, although the total load on a tire is more closely related to contact area, it cannot be said that the relationship between the two parameters is necessarily linear, and a purely one to one relationship is departed from.

In practice, the relationship can be more precisely defined by a calibration curve, an algorithm or database of standard values of inflation pressure for known values of contact pressure, by testing to see what contact pressure arises with a given inflation pressure and repeating with several different inflation pressures. Once the calibration curve, algorithm or database has been defined by repeated tests, it can be used to determine inflation pressure from given readings of contact area that exclude fringe effects.

Typically, tire contact pressure (that is, the external contact pressure between a tire and its support) is sensed, in one embodiment of the invention, over one or more of a series (or a cluster) of small sensors as the vehicle travels over them. The size of these sensors is made sufficiently small so that the tire contact area entirely covers at least one of the sensors. Outputs from sensors which are only partially covered by the tire, are excluded. However, the sensors must also be sufficiently large, or numerous, to average out local contact pressure variations, for example due to tread pattern.

The specific dimensions of the individual sensors are chosen such that more than one sensor is completely covered by the contact area between a tire and its support. Typically, the signal processing of the outputs from said sensors is arranged so that fringe effects, represented by the outputs of those sensors that are only partially covered by the tire, are ignored. Thus, a better estimate of the actual tire pressure is determined than would be the case if only one sensor was used, or if the outputs of all sensors whether wholly or partially in contact with the tire were used.

The clusters of sensors serve to sample average contact pressure over the contact area between a tire and the support while ignoring readings near the edges of the contact area, and thus provide a more reliable reading of the average pressure between support and tire.

In practice, the apparatus comprises clusters of sensors located to read tires on both lateral sides of a vehicle. Typically the outputs from the clusters on both sides are read by processing means at the same time, unless the vehicle is for example a motorcycle.

Typically, the outputs of the relevant sensors are read repeatedly at short time intervals by the processing means, for example, at one hundredth of a second intervals.

A significant feature of the present invention is that the system does not involve the measurement of the actual area itself over which the tire makes contact with the road, but instead involves a measurement of the contact pressure since, in this simples form of the invention, the actual area and thus the total tire load is not of immediate interest.

Preferably, the sensors incorporate plates, the pressure on each plate being sensed by the use of a mechanical flexure and strain gauge. The arrangement of the clusters of sensors, and the precise method of processing of the signals outputted from each sensor, is such that the individual pressures of more than one tire on the same side of an axle may be determined simultaneously at any one time. A double wheeled arrangement is common in commercial vehicles.

When the sensors incorporate plates, the plates may be rigid and typically are circular in plan view. The plates are usually arranged so as to receive tire load in a substantially perpendicular manner.

A variety of sensors may be used and instead of the preferred use of a mechanical flexure and strain gauge, the sensor can also be manufactured from materials that include, for example, piezoelectric materials, piezoresistive materials, and pressure sensitive optical fibres. Typically, the sensing area of each sensor provides a smooth, flat surface profile without bumps, and the deflection of the sensing area of each sensor is small. By meeting such criteria, it can be ensured that the tire contact area is flat, and so the resulting pressure on the contact area is typical.

The apparatus, as described above, provides a first order accuracy estimate of inflation pressure according to the invention in its simples form, but in order further to reduce the inaccuracies caused by edge, stiffness and other peripheral effects, overall accuracy may be improved by additional processing of the output signals from the pressure sensors. To this end, in a more refined version of the invention, it is preferable that not only is the average contact pressure between tire and road calculated as described above, but also calculated are such variables as vehicle track (that is, the distance between wheels on the same axle), number of axles, and number of wheels, which are all deduced from the same sensor readings. These latter variables are then used by the processing means to select correction factors, which are used to modify the determined value of average contact pressure. Optionally, the list of variables used in this way may be further extended to include for instance the vehicle wheel base (that is, the axle separation), the total load on each wheel, and the contact area width and length (excluding peripheral readings). Values for each of these variables are calculated (see below) by the processing means by taking outputs of only those sensors falling entirely within the contact area, and not from all sensors in contact with the tire over the entire width. Thus, as in the measurement of the inflation pressure to a first order of accuracy, peripheral contact effects are avoided when calculating inflation pressure to a greater degree of accuracy in this way.

By measuring such variables, the processing means of the apparatus can build corrections into its calculation of inflation pressure by incorporating suitable algorithms or calibration curves that compare actual variables measured to standard variable values held in a reference database, for example entered from standard data tables. Typically, such correction factors can be inputted into a database which can be accessed by the processing means of the apparatus. Inputting can be achieved by performing a series of tests on the apparatus across a standard range of conditions, that is using a range of vehicles, vehicle loadings and inflation pressures, so that the apparatus can build up its database 'memory' of standard values and can be used afterwards to provide a more accurate estimate of inflation pressures under specific vehicle conditions as required.

In a preferred embodiment, the apparatus is adapted to compensate for the effects of tire temperature variation by making use of means included in the apparatus to sense tire temperature. Such compensation is desirable since temperature variation can significantly alter inflation pressure. Temperature may be measured by conventional infra-red or other means and used as a further input to the selection of correction factors, previously built into the database of the apparatus, which are used by the processing means to calculate an accurate estimate of inflation pressure.

In another preferred embodiment, two or more clusters of sensors are provided to measure tire pressure for tires on wheels located on opposite sides of a vehicle, clusters being longitudinally off-set, making it possible to derive two or more velocity calculations separated in time. Comparison of such velocities permits better detection of any acceleration or deceleration of the vehicle, which will affect wheelbase estimates. If undue acceleration or deceleration is sensed, a repeated test run can be requested at a more nearly constant velocity, so ensuring wheelbase is estimated sufficiently accurately.

According to a further preferred variant, the individual sensors within a cluster may be distributed in a random (or quasi-random) fashion, so as to minimise the risks of errors arising from any correspondence of the tread pattern to the pattern of sensors.

According to a second aspect, the present invention provides a method of determining inflation pressure of a pneumatic tire mounted on the wheel of a vehicle, the tire being in contact with a support over a contact area, said material comprising the following steps:

(i) measuring the average contact pressure between said tire and said support over each sensor within said support, each sensor having a surface area less than said contact area; and (ii) processing output signals from only a sensor or sensors which fall entirely within said contact area, to determine an average contact pressure and so provide a measure of the inflation pressure of the tire to a first order of accuracy.

Other optional features of present invention will be evident from the accompanying dependent claims.

The present invention will now be described in further detail with reference to the following non-limiting examples, as illustrated in the figures in which.

Figure 1:
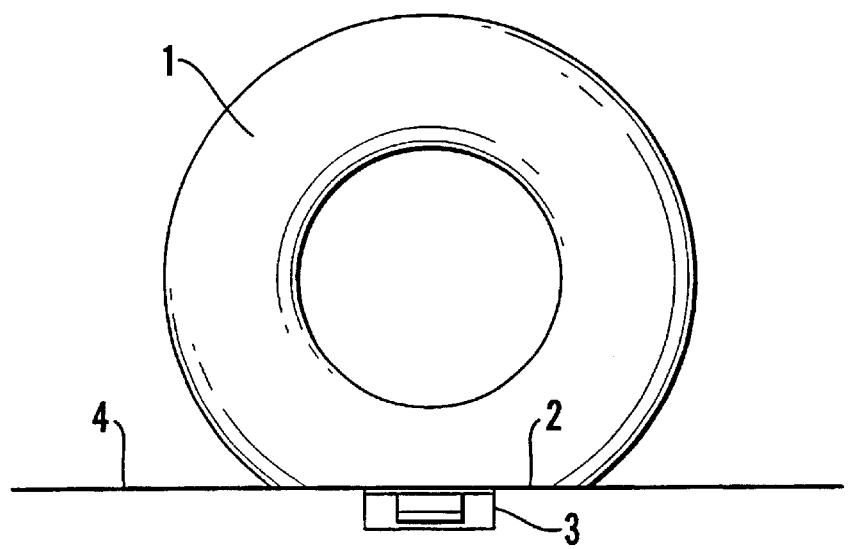
FIG. 1 shows a tire of a loaded vehicle, the tire being positioned momentarily over a sensor of an apparatus according to one embodiment of the present invention.

In FIG. 1, a tire pressure sensor (3) is shown installed in a road such that the top surface of the sensor is flush with the road surface (4). The dimensions of the sensor (3) are a suitable proportion of the size of a tire contact area (2) of a tire (1). Thus, the sensor (3) is not so small as to be unduly affected by local variations in tire stiffness and so forth, nor is it so large that the sensing area always includes some of the fringes of the tire contact area (2) where contact pressures are likely to be non-typical.

The sensor assembly is composed of a housing accommodating a stiff plate, typically constructed of metal or other material. Located beneath the plate is a load or pressure sensing means, which may be a mechanical flexure and strain gauge, or a piece of piezoelectric or piezoresistive material. The pressure sensing means is linked to suitable data processing electronics to provide a reading of the pressure applied to the top surface of the plate. A flexible cover protects the assembly from water and dirt ingress and mechanical damage. The plate has dimensions chosen so that the sensed area is less than the contact area of the tire with the road. Typically, the plate might be between 40 and 50 mm in diameter. Although typically circular, the plates can be of different shape and so can, for example, be rectangular.

The contact area is typically 200 mm×400 mm, and usually rectangular with roughly rounded off corners, that is with near oval ends. Each sensor has a surface area that is between 0.1 and 25% of the contact area, preferably between 1 and 10%, more preferably between 3 and 8%, for example 5% of the contact area.

A series of such plates, closely spaced, thus ensures that at least one of the plates lies completely within the tire contact area, so avoiding fringe effects and thus providing a reliable measurement of the average pressure between tire and road. As explained above, the latter measurement is related to the tire's inflation pressure to a first order of accuracy. Each sensor (3) is connected independently by a lead to the data processing electronics (not shown), which detects which plates have been loaded by the passage of the tire, and to derive the average pressure between tire and road from the most appropriate plate or plates.

Figure 6:
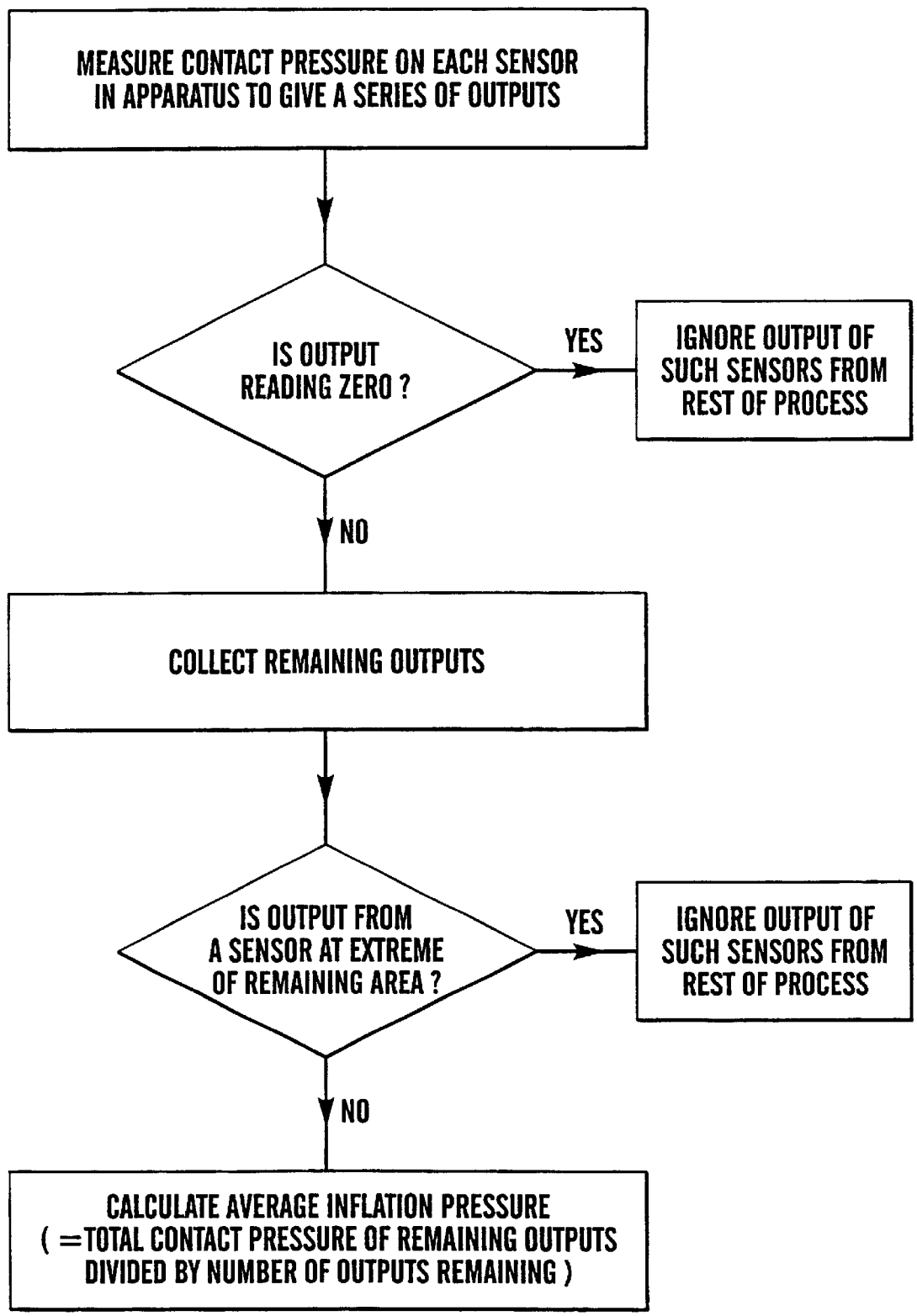
FIG. 6 is a schematic representation of the processing steps carried out in one embodiment by the processing means of the apparatus and method of the present invention.

The processing means can differentiate, in a number of ways, between the outputs of sensors that are only partially covered by a tire and those that are totally covered. One simple method is a topographical method in which, for a close packed row of sensors running across the whole tire width, the two nonzero sensor readings at the two extreme ends of the row are ignored. The processing means of an embodiment of the apparatus using this simple topographical method calculates average inflation pressure by way of a series of processing steps, which are shown in the schematic algorithm of FIG. 6, for the simplified, topographical approach.

Figure 2:
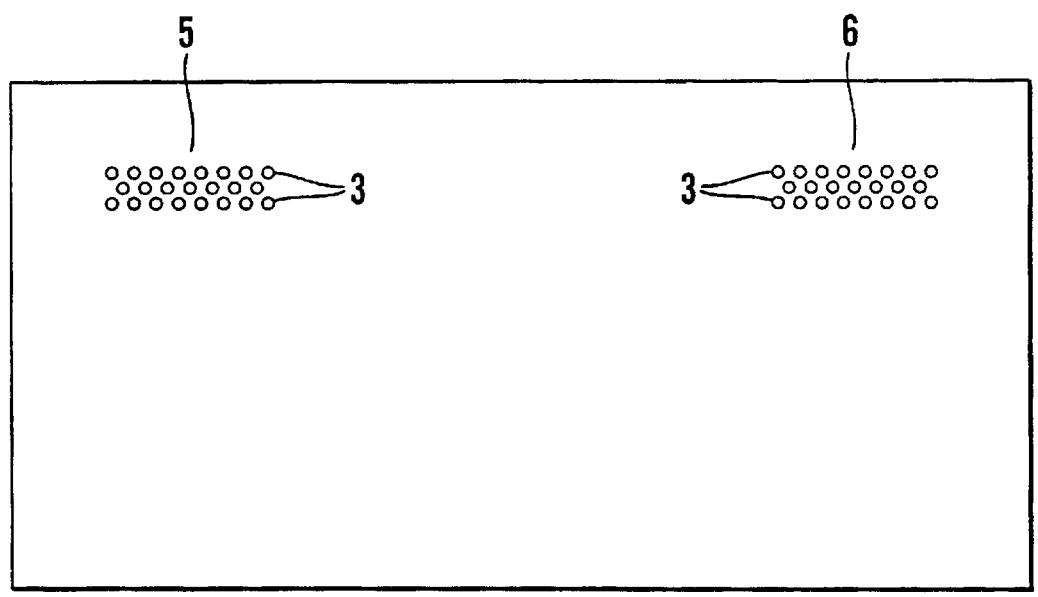
FIG. 2 illustrates two clusters of sensors, that are not off-set, for measuring inflation pressure of a vehicle's tires according to the present invention.

A more preferred arrangement is to have, for example, three rows of closely packed, circular sensors in an approximately hexagonal layout, in which each row is offset sideways by one third of the sensor spacing, with respect to the row behind it. Such an arrangement makes it possible, by recording which are the non-zero edge sensors, to locate the location of the edge of the contact patch, to an accuracy of one third of the sensor spacing. This will allow the inclusion of, for example, a sensor which is fully loaded but happens to be at the end of its row and which would therefore have otherwise been rejected. A layout of clusters (5, 6, 7, 8) of sensors is illustrated schematically in FIGS. 2 and 3.

Alternatively, if the pattern of sensors is non-symmetrical, the processing means calculates the most central point within the area covered by the sensors that give a non-zero output. This type of calculation allows the distance and direction of each non-zero reading sensor to be measured and the output of the remotest of such sensors in each direction is chosen to be ignored.

A third, but less preferred approach, involves the calculation of the average pressure on all non-zero reading sensors, with subsequent selection such that outputs from all individual sensors with a reading of less than this average are ignored. Whilst being a simple and easily performed approach, this approach is less favored since, if a stone is caught in the tire tread, all low pressure readings immediately around the contact area with the stone would be eliminated, thus providing an inaccurate overall measurement.

When a mechanical flexure and strain gauge is adopted as a sensing means, the use of one or more plates of fixed area is required in order that the load sensed by the device can be calculated from that fixed area. By contrast, the use of piezoelectric or piezoresistive sensing devices make such plates optional, since such devices, by their very nature, may generate signals which reflect pressure rather than load.

The above described apparatus and method allow measurement of inflation pressure to a first order of accuracy. However, in the more refined version of the invention, in order to improve accuracy, one can measure variables such as vehicle track and wheelbase, and use such information to compensate for discrepancies between the actual measured tire/road pressure and standard measurements of tire inflation pressure previously entered into a database which the processing means can access as a 'look-up' table of correction factors.

In this way, the following parameters can, for example, be entered into the associated database system:

Vehicle track,

Vehicle wheelbase,

Number of vehicular axles or total number of tires,

Total load on each wheel, assessed from only those sensors falling entirely within contact patch Width of contact area assessed from only those sensors falling entirely within contact patch, and Length of contact patch assessed from only those sensors falling entirely within contact patch.

Vehicular track, or the distance between the two wheels on the same axle, may be measured by reference to the location of the center point of the fully loaded sensors on each side of the apparatus and calculating the distance therebetween.

Measurement of axle spacing and wheelbase can be achieved by measuring the time interval between the arrival of successive wheels at a specific sensor or sensor row ("on times"), and estimating the speed of the vehicle's passage over the sensing equipment. Estimates of the latter can be made by measuring the time intervals between the arrival of a specific tire at successive rows of sensors, as the spacing between these rows is known. The whole can be repeated for the times when the tire leaves the sensors ("off times"), to provide a larger data sample.

A preferred approach is to note these on times and off times at every sensor contacted (or fully contacted) and infer the speed and thence the axle spacings from every sensor's or sensor row's signals, then averaging the results. In this way, the best possible estimates of axle spacing are achieved.

Figure 3:
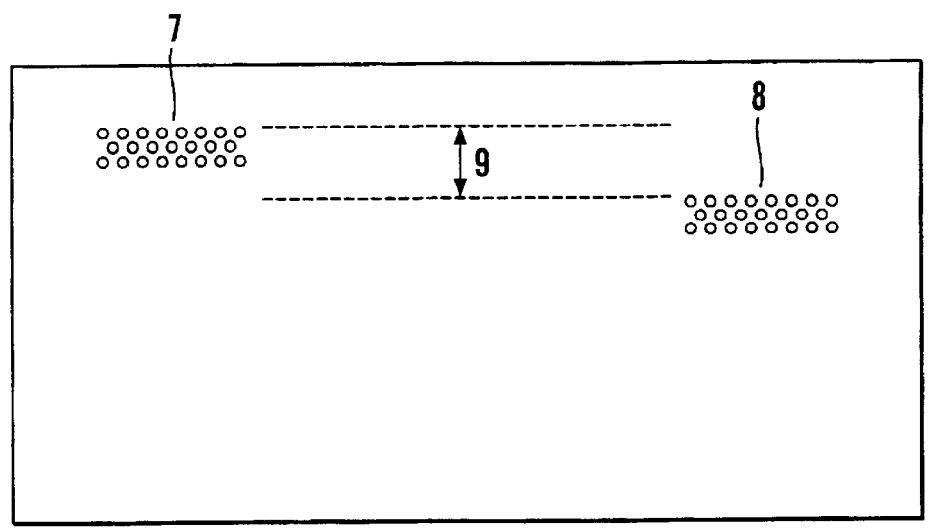
FIG. 3 shows two longitudinally off-set clusters of sensors for measuring inflation pressure more accurately by ensuring that inflation pressure is only calculated when velocity is substantially constant which permits more accurate estimation of wheelbase and thence inflation pressure, according to another embodiment of the present invention.

The accuracy of such estimates can be further improved by offsetting two clusters(7,8) of sensors (3) longitudinally by a distance (9), as shown in FIG. 3, so that a wheel on one side of an axle impinges on its respective cluster (7) of sensors (3) at an instant different from the instant when the wheel on the other side impinges on the second cluster (8) of sensors (3). Offsetting in this way permits more reliable speed estimation, since significant acceleration/retardation is more likely to be identified, in which case a re-run at more constant speed can be requested.

Number of vehicle axles present can be deduced from the number of repeating patterns at each row of sensors. Similarly, number of tires on each axle can be calculated from the pattern distribution over all sensors taken together. Total load on each wheel can be estimated by multiplying the average contact pressure by the estimated contact patch size assessed from only those sensors entirely covered by each tire.

Contact path length can be estimated, assessed only from outputs of fully loaded sensors, by measuring the on time and off time for the same sensor(s) to give a time interval for the contact period. Knowing the velocity of the vehicle (for estimate, see above) and this time interval, the length of the contact patch can easily be determined.

Figure 4:
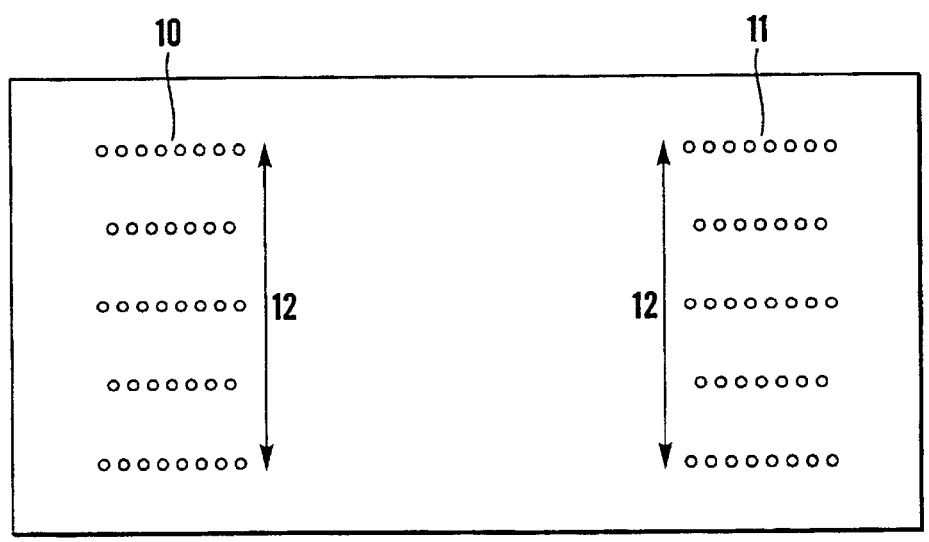
FIG. 4 shows two clusters of sensors, where each cluster is arranged to sense a tire's presence over a greater length of the tire circumference, according to a further embodiment of the present invention.

In a preferred arrangement, it is envisaged that the clusters of sensors should extend some way in al longitudinal direction i.e. the direction of motion of the wheel, so that a significant length of the tire perimeter is sampled as the vehicle rolls over the array. When the vehicle is in motion an array length of some two feet (0.6 meters) is suitable for an overall tire perimeter of six feet (1.8 meters) or so. Such an arrangement is illustrated in FIG. 4, in which clusters (10, 11) of sensors are located with an increased dimension (12) in the direction of tire perimeter.

The arrays thus serve to sample average contact pressure over an extended length of the tire perimeter, while ignoring readings near the edges of the contact patch, so as to provide a more reliable average pressure measure.

Figure 5:
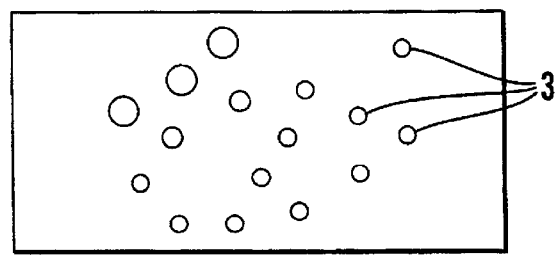
FIG. 5 illustrates a random, or quasi-random, distribution of sensors forming a cluster for use in an apparatus or method according to a further embodiment of the present invention.

FIG. 5 illustrates a cluster of sensors (3) in which the sensors (3) are distributed in an random, or quasi-random, fashion. This type of arrangement minimizes the risk of errors arising from exact, or relatively exact, correspondence of tread pattern features to the features of the sensor pattern. Such a random, or quasi-random, arrangement may be used in any of the embodiments described above.

The present invention provides a rapid and simple way of providing a measurement of tire inflation pressure, to at least a first order of accuracy, which therefore allows vehicle drivers to check the tire pressure at frequent intervals and without difficulty, so reducing tire wear and increasing vehicle safety and fuel economy. Further, the inflation pressure of a wide range of types of pneumatically tired vehicles can be checked or monitored by the apparatus and method of the present invention.

What is claimed is:

1. An apparatus for determining inflation pressure of a pneumatic tire mounted on a wheel of a vehicle, the apparatus comprising:
   (i) a support for supporting the tire such that the tire is in contact with the support over a contact area;
   (ii) a plurality of sensors within the support each for measuring the pressure applied to a respective surface area of the support and providing a respective output, each surface area being less than the contact area, and the surface areas being arranged so that at least one of the surface areas can be completely covered by the tire; and
   (iii) processing means for processing the outputs of the sensors (a) to select which of the sensors has a surface area that falls within the contact area and (b) to determine the inflation pressure of the tire to a first order of accuracy from the output or outputs of the selected sensor or sensors disregarding the output or outputs of the other sensor or sensors.

2. The apparatus of claim 1, wherein said processing means is adapted to incorporate a correction factor into the determination, said correction factor being cross-referenced from a database of values of standard inflation pressures for known values of contact pressures.

3. The apparatus of claim 1, wherein the sensors comprise plates flush with a road surface.

4. The apparatus of claim 1, wherein each sensor is adapted to sense contact pressure substantially perpendicular to the surface of the support.

5. The apparatus of claim 1, wherein the sensing means of the sensors is selected from the group consisting of a mechanical flexure and strain gauge, piezoelectric material, piezoresistive material, pressure sensitive optical fiber, and any combination thereof.

6. The apparatus of claim 1, wherein the sensors are arranged in two or more clusters which are off-set to one another with respect to the longitudinal axis of the vehicle.

7. The apparatus of claim 1, wherein the sensor(s) are arranged randomly, or quasi-randomly, in clusters.

8. The apparatus of claim 1, wherein each sensor has a sensing surface area of between 5 and 25 $cm^2$, preferably between 12 and 18 $cm^2$.

9. A method of determining inflation pressure of a pneumatic tire mounted on a wheel of a vehicle, the method comprising:
   (i) supporting the tire in contact with a support over a contact area;
   (ii) measuring the pressure applied to each of a plurality of surface areas of the support, each surface area being less than the contact area, and the surface areas being arranged so that at least one of the surface areas can be completely covered by the tire; and
   (iii) processing the measured pressures (a) to select which of surface areas falls within the contact area and (b) to determine the inflation pressure of the tire to a first order of accuracy from the measured pressures for the selected surface areas disregarding the measured pressures for the other surface areas.

10. The method of claim 9, wherein said processing step comprises incorporating a correction factor into the determined average contact pressure, said correction factor being selected by cross-referencing from a database of values of standard inflation pressures for known values of contact pressure.

11. The method of claim 10, wherein inflation pressure is further recalculated to a greater degree of accuracy by incorporationg a further correction factor selected during processing from a database of further correction factores for known vehicle types.

12. The method of claim 11, wherein the processing step comprises selecting the appropriate further correction factor by comparing measurements of an actual vehicle with known measurements for a wide range of known vehicles.

13. The method of claim 12, wherein the measurements are selected from the group consisting of vehicular track, vehicular wheelbase, number of vehicular axles, number of vehicular tires, total load on each tire and any combination thereof.

* * * * *